United States Patent [19]

Cunningham

[11] 3,938,132
[45] Feb. 10, 1976

[54] ILLUMINATED FISHING TACKLE BOX

[76] Inventor: Jerry L. Cunningham, 301 N. College, Cordell, Okla. 73632

[22] Filed: Dec. 6, 1974

[21] Appl. No.: 530,218

[52] U.S. Cl. .......................... 340/321; 340/29; 43/4; 240/6.4 F
[51] Int. Cl.² ........................................ G08G 3/00
[58] Field of Search ........ 340/29, 321, 366 R; 43/4, 43/17.5; 116/26, DIG. 43, DIG. 44; 240/6.4 F, 6.45 R, 7.5

[56] References Cited
UNITED STATES PATENTS

| | | | |
|---|---|---|---|
| 2,517,914 | 8/1950 | Nowaczek | 240/6.4 F |
| 2,739,305 | 3/1956 | Harmon | 340/321 |
| 3,205,487 | 9/1965 | Vriend | 340/321 |

Primary Examiner—Thomas B. Habecker
Attorney, Agent, or Firm—William R. Laney

[57] ABSTRACT

An illuminated fishing tackle box which includes an opened topped base portion of generally right parallelepiped configuration, a lid hingedly connected to one side of the base portion and forming a closure for the open top of the base portion, and a light swivelly mounted on one end of the base portion on the outside thereof for selectively directing a light beam in a direction extending toward the bottom side of, or alternately, directly out from, the base portion. A second light of different color from the first-mentioned light is mounted on the opposite end of the base portion from the first-mentioned light, electrical circuitry interconnects the two lights and includes means for causing the second mentioned light to undergo an intermittent on-off status so as to present a flashing light. The fishing tackle box of the invention further includes a third light mounted in the lid of the box on the side thereof which faces the interior of the base structure, and which is oriented to direct light downwardly into the open interior of the base structure.

10 Claims, 3 Drawing Figures

ILLUMINATED FISHING TACKLE BOX

BACKGROUND OF THE INVENTION

1. Field of the Invention

This invention relates to containers for fishing tackle, and more particularly, to illuminated fishing tackle boxes which have various types of lights or illuminable elements secured thereto for utilization during night fishing.

2. Brief Description of the Prior Art

It has been heretofore proposed to provide illumination in association with fishing tackle boxes and containers so that the fishing lures and other paraphernalia contained in the tackle box can be seen at night as the fisherman rigs out his line or changes his lure. Additionally, some prior proposals have contemplated the inclusion of external lights on the fishing box for the purpose of providing light in the boat, or adjacent the fisherman to illuminate the ground around the fisherman when bank fishing. Patents directed to structures of the type described include Zucker U.S. Pat. No. 3,404,267, Woolworth U.S. Pat. No. 3,346,733 and Nowaczek U.S. Pat. No. 2,517,914.

BRIEF DESCRIPTION OF THE PRESENT INVENTION

The present invention provides a versatile and useful fishing tackle box or container which has a large open topped base portion or structure having a lid hinged to the upper side thereof for closing the open upper side of the base portion. The fishing tackle box further includes a first light for illuminating the interior of the box, and a pair of additional lights on the outside of opposite ends of the fishing tackle box. One of these lights is a swively or movably mounted light which can be oriented to direct the light beam therefrom in a direction extending normal to the end face of the box, or can be moved to a position where it directs a beam of light downwardly to illuminate the ground as the fisherman carries the box, or as it is resting upon or near the ground. The light at the opposite end of the box is a red light which can be constantly and continuously illuminated, or alternately, can be made to flash on and off intermittently to provide an emergency signal. With the provision of the white light at one end of the box and the red light at the other, the box may be used in emergency situations to provide a running light or lights for the box to provide the conventional and standard red light to port and a white light showing forward or aft of the boat as may be required.

An important object of the invention is to provide a fishing tackle box which includes a light positioned in the lid of the box to illuminate the interior of the box in the course of night fishing.

Another object of the invention is to provide a fishing tackle box which includes a red light at one end thereof and a white light at the other end thereof so that the box can be employed to direct an appropriately colored signal from a boat in the manner of a navigational running light.

A further object of the invention is to provide an illuminated fishing tackle box which includes a white light at one end thereof which can be directed straight out from the box in a direction horizontal to the ground, or can be directed downwardly to illuminate the ground as the box is carried by the fisherman.

Additional objects and advantages of the invention will become apparent as the following detailed description of a preferred embodiment of the invention is read in conjunction with the accompanying drawing which illustrates such preferred embodiment.

GENERAL DESCRIPTION OF THE DRAWINGS

DETAILED DESCRIPTION OF A PREFERRED EMBODIMENT OF THE INVENTION

Figure 1:
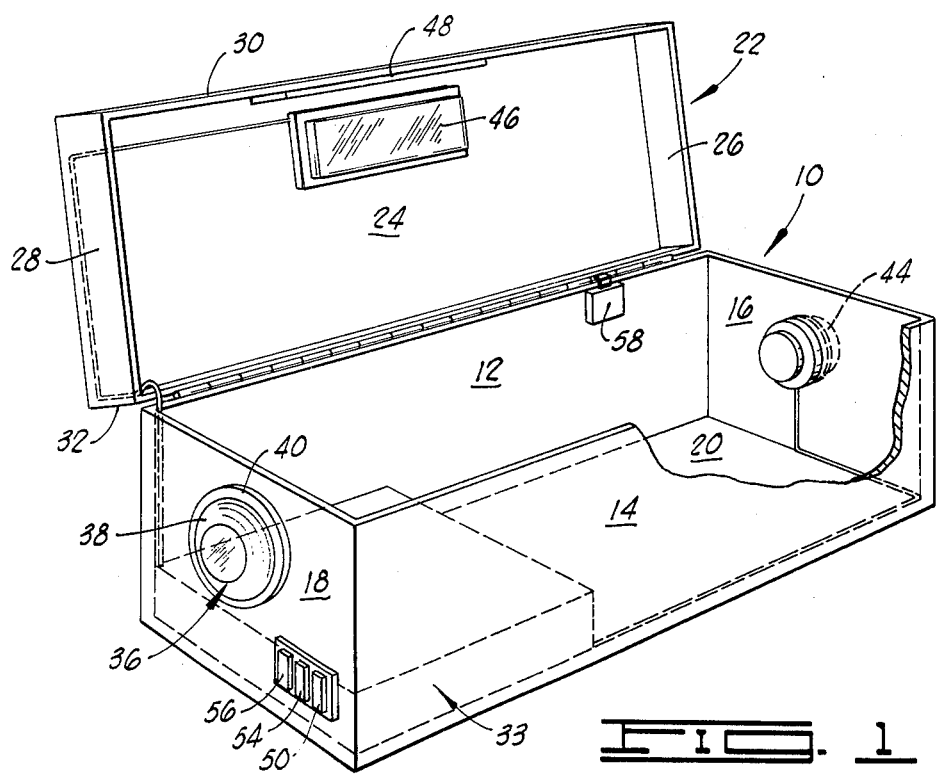
FIG. 1 is a perspective view illustrating a fishing tackle box constructed in accordance with the invention.

Referring initially to FIG. 1 of the drawings, shown therein is an illuminated fishing tackle box constructed in accordance with the present invention. The box includes a base portion designated generally by reference numeral 10, such base portion being of generally right parallelepiped configuration and including a back wall 12, a front wall 14, end walls 16 and 18 and a bottom wall 20. The base portion 10 is, of course, of open topped configuration. As is conventional construction in fishing tackle boxes, a plurality of tiered, hingedly connected trays will be positioned in the base portion 10 for holding sinkers, line, lures and other paraphernalia used by the fisherman, but such trays are not illustrated in the accompanying drawings in order to permit the more important aspects of the invention to be more clearly seen.

Hingedly connected to the base portion 10 by pivotal securement to the upper edge of the back wall 12 is a lid or cover designated generally by reference numeral 22. In the embodiment of the invention shown, the lid includes a top panel 24 extending between a pair of end panels 26 and 28. A handle 29 is secured to the outer side of top panel 24. The lid also includes a forward side 30 and a rear side 32.

Figure 2:
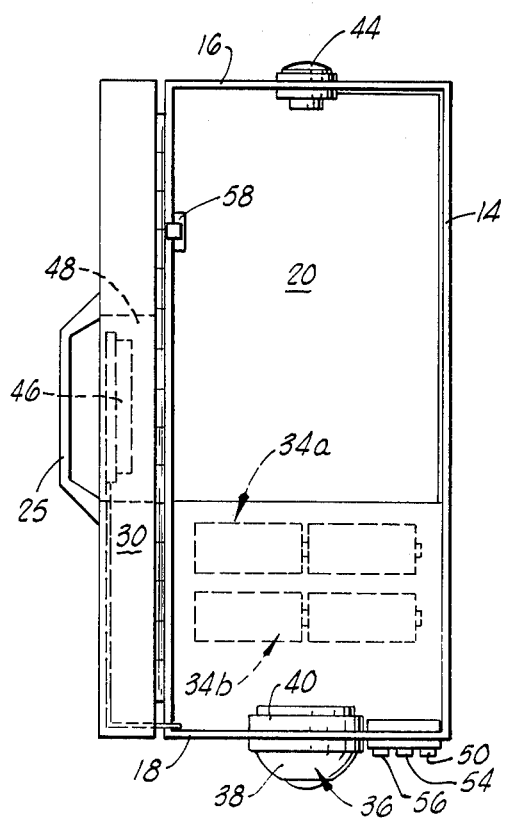
FIG. 2 is a plan view of the fishing tackle box shown in FIG. 1.

Positioned in the lower part of the base portion 10 is a battery case designated generally by reference numeral 33. Although the battery case is shown as supported within the base portion 10 and projecting above the bottom wall 14, batteries used in the electrical circuitry hereinafter described may actually be disposed in the bottom wall where this wall has sufficient thickness, and manufacturing costs admit of such enclosure. Positioned within the battery case 33 are a plurality of batteries illustrated in dashed lines in FIG. 2 of the drawing and indicated generally by reference numerals 34a and 34b.

Secured to the outer side of the end wall 18 is a swively or movably supported light 36. The light 36 is preferably a white light, and is mounted in a ball joint type casing 38 movably supported within a housing 40 which is mounted in the end wall 18. This type of light 36 is commercially available, and its construction is such that the light may be swiveled in the housing 40 so that the beam projecting therefrom can be extended downwardly toward the ground, or caused to project in a direction substantially normal to the plane of the end wall 18.

At the opposite end of the fishing tackle box, and mounted in the center of the end wall 16 is a second light 44. The light 44 is preferably a red light and is stationarily fixed in the end wall 16, as contrasted with the movable mounting of the light 36 in the end wall 18.

Secured at a central location in the lid 22 of the fishing tackle box is a third light 46 which is constructed and positioned to illuminate the interior of the base portion 10 when the lid 22 is opened to the position shown. To facilitate the illumination of the base portion 10, a reflector plate 48 is preferably provided at a location over the light 46 when the lid 22 is open, and this plate functions to reflect and direct the light downwardly into the open base portion 10.

Figure 3:
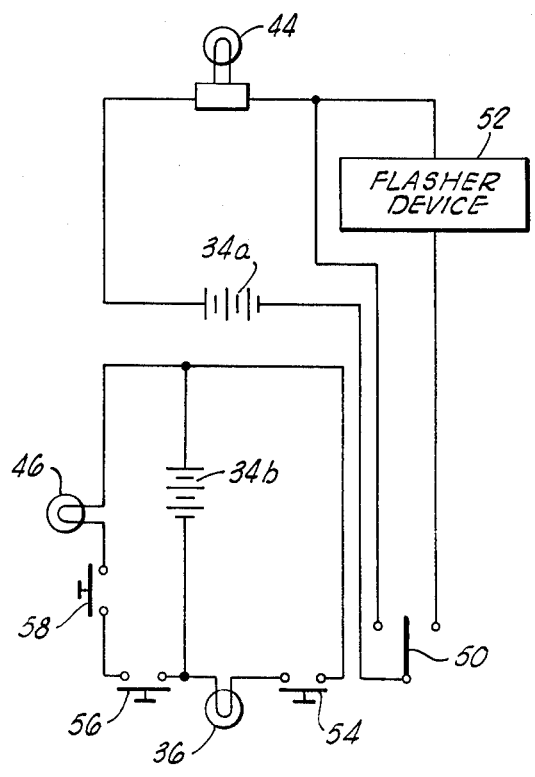
FIG. 3 is an electrical wiring diagram depicting the circuitry employed in the tackle box of the invention.

The circuitry which is utilized in conjunction with the lights 36, 44 and 46 of the illuminated fishing tackle box of the invention is shown in FIG. 3 of the drawings. A first circuit includes batteries 34a connected to the light 44 through a double throw switch 50. Parallel circuitry used in conjunction with the switch 50 permits a flasher device 52 of conventional and well-known construction to be connected in series with the light 44, or, alternatively, the light 44 can be connected directly to the batteries 34a without the flasher device 52 in the circuity. The light 44 may thus, by selective positioning of the switch 50, be caused to be continuously illuminated or the light may be caused to intermittently flash as a result of the opening and closing of the circuit by the flasher device 52.

A second circuit which is provided includes the batteries 34b which are connected through parallel circuitry to the lights 36 and 46. The lights 36 and 46 can be selectively illuminated by closure of switches 54 and 56, respectively. As portrayed in FIGS. 1 and 2, the switches 50, 54 and 56 are disposed on the outer side of the end wall 18, and are thus accessible to the fisherman. Another switch 58 is positioned between the lower edge of the back plate 32 of the lid 22 and the back wall 12 of the base portion 10 so that, when the lid 22 is closed, the circuit to the light 46 is automatically opened.

OPERATION

The illuminated fishing tackle box of the invention can be usefully employed in a number of ways. Initially, as the fisherman proceeds to the place where the fishing will be undertaken, the tackle box can be used as flashlight or search light by adjusting the position of the swively mounted light 36 so that its beam projects downwardly upon the ground to light the fisherman's passage to the boat dock, or to the place on the bank where he will fish. In other instances, it may be very useful to orient the light 36 so that its beam projects directly outwardly or normal to the plane of the end wall 18 so that the light is used as a spotlight, or for the purpose of illuminating distant objects. This may be particularly advantageous in instances where a boat is approaching a dock or pier for a landing, or is moving in close to the bank on a dark night when submerged trees or other obstructions to maneuvering and navigations may be difficult to discern.

Immediately prior to commencing fishing, the tackle box will usually be opened to rig out the lines to be used in fishing. In this instance, the fisherman will need illumination of the interior of the base portion 10 in order to be able to see and select the lures, weights, line or other tackle which is needed. When the lid 22 is opened, the switch 58 will be closed, and then the fisherman can provide illumination to the interior of the box by manual closing of the switch 56 located on the end wall 18. After the line has been rigged out and fishing has started, the fisherman will often desire to open the switch 56 so as to darken the light 46 and save drain on the batteries 34b, as well as to prevent glare in the eyes of the fisherman preventing close scrutiny of the area into which he wishes to cast, or if float fishing, observation of the bobber or cork. The fisherman may, alternatively, simply wish to close the lid 22 which will automatically open the switch 58 and thereby turn off the light 46.

Occasions are known to all avid fisherman when it is desirable to have certain emergeny or navigational signals available on the boat in use. For example, in returning to a landing or pier where there is heavy traffic at night, it is imperative that boats carry certain running or navigational lights so that their movements and direction of travel can be known to other boats approaching the landing and collisions can be avoided. The navigational lights which are normally provided on such craft sometimes malfunction, thus either not providing the necessary warning and apprisal to other boats of the movements of the craft having the malfunctioning lights, or actually being deceptive by reason of some of the lights functioning and others failing to function. By the established rules of navigation on inland waters, a steadily burning red light is conventionally carried on the port side of the craft or vessel to apprise other craft of the fact that they are viewing that particular side of the light-carrying craft as it moves through the water. Should this particular light malfunction, the illuminated fishing tackle box of the present invention can be used to supply a substitute light. This is accomplished by closing the switch 50 to the position such that the light 44 is steadily and continuously illuminated to provide a red light of the type needed to identify the port side of the vessel or craft. A generally similar usage can be made of the white light 36 provided on the end wall 18 where one of the white navigational lights has malfunctioned.

In another situation of usage of the present invention, an emergency situation can arise aboard of the boat or craft in use by the fisherman where assistance is direly needed. Such an occasion can exist where high winds have developed on large inland lakes, and the craft is in danger of swamping, or has perhaps developed engine trouble and has insufficient power to return to the shore. In such instances, the red light 44 carried on the end wall 16 can be made to intermittently flash by moving the two-way switch 50 to a position such that the flasher device 52 is placed in the circuit with this light. In this status, the light 44 will continue to flash on and off, apprising observers from the shore, or on other craft, that the boat providing such signal is imperiled. It is, of course, also possible to use either the red light 44 or the white light 36 in an on-off fashion by manual manipulation of the switch 50 or the switch 54, respectively, to provide a Morse code signal should the fisherman be familiar with the code.

From the foregoing description of the invention, it will be perceived that the illuminated fishing tackle box of the invention is a highly versatile structure which can be utilized in a number of ways to aid the fisherman, and to provide additional safety devices on relatively small boats often used in fishing. Although one form of the invention has been herein shown and described, it will be perceived that various changes and innovations in the structure illustrated and described by way of example can be made without departing from the basic principles of the invention. Changes and innovations of this type are deemed to be circumscribed by the spirit and scope of the invention except as the same may be necessarily limited by the appended claims or reasonable equivalents thereof.

What is claimed is:

1. An illuminated fishing box comprising:
   a hollow base portion having a pair of opposed end walls;
   a lid hingedly connected to one side of the base portion; and
   a light movably mounted in one of said end walls for manual movement to varying positions in said one end wall to direct light downwardly or outwardly from the fishing box.

2. An illuminated fishing box as defined in claim 1 and further characterized in including:
   a second light mounted in the other of said end walls on the outside of said base portion; and
   electrical circuitry including a flasher device connected to said second light for causing said second light to flash on and off intermittently.

3. An illuminated fishing box as defined in claim 1 and further characterized as including:
   an inside light carried on said lid;
   means on said lid for directing illumination from said inside light downwardly into said base portion; and
   electrical circuitry connected to said inside light and including:
   a first switch mounted on the outside of said base portion;
   a second switch mounted in one of said base portion and lid and operable upon closure of said lid to open the electrical circuit to said inside light; and
   a source of electrical power.

4. An illuminated fishing box as defined in claim 2 wherein said first mentioned light is a white light and said second light is a red light.

5. An illuminated fishing box as defined in claim 4 wherein said electrical circuitry connected to said second light is further characterized as including means for selectively continuously illuminating said second light, or alternatively, flashing said second light on and off intermittently.

6. An illuminated fishing box as defined in claim 2 and further characterized as including:
   an inside light carried on said lid;
   means on said lid for directing illumination from said inside light downwardly into said base portion; and
   electrical circuitry connected to said inside light and including:
   a first switch mounted on the outside of said base portion;
   a second switch mounted in one of said base portion and lid and operable upon closure of said lid to open the electrical circuit to said inside light; and
   a source of electrical power.

7. An illuminated fishing box as defined in claim 6 wherein said first mentioned light is a white light and said second light is a red light.

8. An illuminated fishing box as defined in claim 7 wherein said electrical circuitry connected to said second light is further characterized as including means for selectively continuously illuminating said second light, or alternatively, flashing said second light on and off intermittently.

9. An illuminated fishing tackle box as defined in claim 8 wherein said means for selectively continuously illuminating said second light comprises:
   a source of electrical power;
   a parallel circuit connected to said second light and extending in electrical parallel to said electrical circuitry including said flasher device; and
   a double throw switch connected in said parallel circuits and selectively switchable to connect a selected one of said parallel circuits in said source of electrical power.

10. An illuminated fishing tackle box as defined in claim 1 and further characterized as including:
    a ball joint type casing retaining said first mentioned light; and
    a housing mounted in said one end wall and swivelly retaining said casing.

* * * * *